US005184924A

United States Patent [19]

Takalo et al.

[11] Patent Number: 5,184,924

[45] Date of Patent: Feb. 9, 1993

[54] METHOD AND EQUIPMENT FOR TRANSFERRING CONCRETE SLABS

[75] Inventors: Pasi Takalo, Temmes; Pekka Kinnari; Mikko Henriksson, both of Tampere; Tapani Nikku, Pirkkala; Hannu Myllymäki, Kalajoki, all of Finland

[73] Assignee: Partek Concrete Oy Ab, Helsinki, Finland

[21] Appl. No.: 695,407

[22] Filed: May 3, 1991

[30] Foreign Application Priority Data

May 4, 1990 [FI] Finland .................................. 902243

[51] Int. Cl.[5] ........................ B65G 57/03; B65H 29/18

[52] U.S. Cl. .......................................... 408/67; 83/90; 83/94; 264/333; 414/788.7; 414/789.9; 414/792.9

[58] Field of Search ............... 414/788.7, 789.7, 789.9, 414/790.2, 792.9, 788.4; 83/90, 91, 94, 153, 160; 264/155, 156, 333; 408/67

[56] References Cited

U.S. PATENT DOCUMENTS

| | | | |
|---|---|---|---|
| 3,939,994 | 2/1976 | Suzzi | 414/792.9 X |
| 4,083,908 | 4/1978 | Kalvenes et al. | 414/792.9 X |
| 4,434,119 | 2/1984 | Teare | 264/145 |

FOREIGN PATENT DOCUMENTS

| | | | |
|---|---|---|---|
| 0040571 | 11/1981 | European Pat. Off. | 414/789.9 |
| 1556227 | 1/1970 | Fed. Rep. of Germany . | |
| 3216886 | 11/1983 | Fed. Rep. of Germany . | |
| 233742 | 3/1986 | Fed. Rep. of Germany . | |
| 1502861 | 11/1967 | France | 414/792.9 |
| 2337681 | 8/1977 | France | 414/792.9 |
| 0004824 | 1/1982 | Japan | 414/792.9 |

*Primary Examiner*—Steven C. Bishop

*Attorney, Agent, or Firm*—Burns, Doane, Swecker & Mathis

[57] ABSTRACT

Two lifting units (1, 2) have lifting grabs (3) for lifting individual concrete slabs (29) off a prestressing bed on which they have been cast and then stacking them on a pair of support beams (6) to form a pile (28). Once the pile (28) has been formed, the lifting units (1, 2) use lifting hooks (16) contained within an upper frame (14, 15) to lock into the beams (6). A jacking mechanism (13) then raises the upper frames (14, 15) relative to lower frames (11, 12) to lift up the entire pile of slabs (28). The lifting units (1, 2) are mounted on rails (9) which run along the sides of the prestressing bed and lead off to a stockyard where the pile of slabs (28) is taken by the lifting units (1, 2) for storage. During transfer of the individual slabs (29) to the pile (28), drilling units (4) are swung under each slab (29) to drill drainage holes. One of the lifting units (1) has a container (21) for dispensing and collecting the beams (6).

12 Claims, 6 Drawing Sheets

METHOD AND EQUIPMENT FOR TRANSFERRING CONCRETE SLABS

This invention relates to a method and apparatus for lifting concrete slabs from a prestressing bed and forming them into a pile and then transferring the pile to a stockyard.

After concrete slabs have been produced on a prestressing bed by slide casting a long solid slab and then cutting the slab into separate slabs of convenient size, the slabs are left in a line on the prestressing bed and need to be collected and transferred away from the prestressing bed. When slabs are to be kept horizontal whilst being moved, the normal method involves moving two transport wagons to a transport track beside the prestressing bed and then stacking the slabs on the wagons by using a crane in the casting bay. Then the wagons and the pile of slabs thereon are pulled from the casting bay. The lateral transfers needed when using this method are time consuming for the ceiling crane in the casting bay. In addition to this, the transport track uses up some of the area of the casting bay.

According to a first aspect of the present invention, there is provided a method of lifting concrete slabs from a prestressing bed and forming them into a pile and then transferring the pile to a stockyard, characterized in that the slabs are lifted from the prestressing bed and formed into the pile by a transfer device which moves along a transport track formed by rails positioned on both sides of the prestressing bed, the pile being formed on a support structure, and then the support structure with the pile of slabs thereon is lifted and transferred along the same transport track, or an extension thereof, to the stockyard.

According to a second aspect of the present invention, there is provided apparatus for lifting concrete slabs and transferring them from a prestressing bed, characterized in that the apparatus comprises two lifting units movably mounted on rails, each of the lifting units having lifting means for lifting slabs and transferring them onto a support structure as well as for lifting and transferring the support structure with the pile of slabs thereon.

The present invention enables the finished slabs to be transferred to the stockyard quickly and flexibly.

When using the present invention, no separate transport tracks are needed in the casting bay. There is no need to use the ceiling crane in the casting bay to transport the slabs because lateral transfers are not needed. The prestressing bed can be quickly cleared and thus the production space is quickly free to be used again. The slabs can be stacked and transferred to the stockyard by the same equipment. In one embodiment, drainage openings for draining condensed water from inside each hollow slab are drilled in the bottom surface of the ends of the slab by the lifting units.

A non-limiting example of the present invention will now be described with reference to the accompanying drawings, in which.

Figure 1:
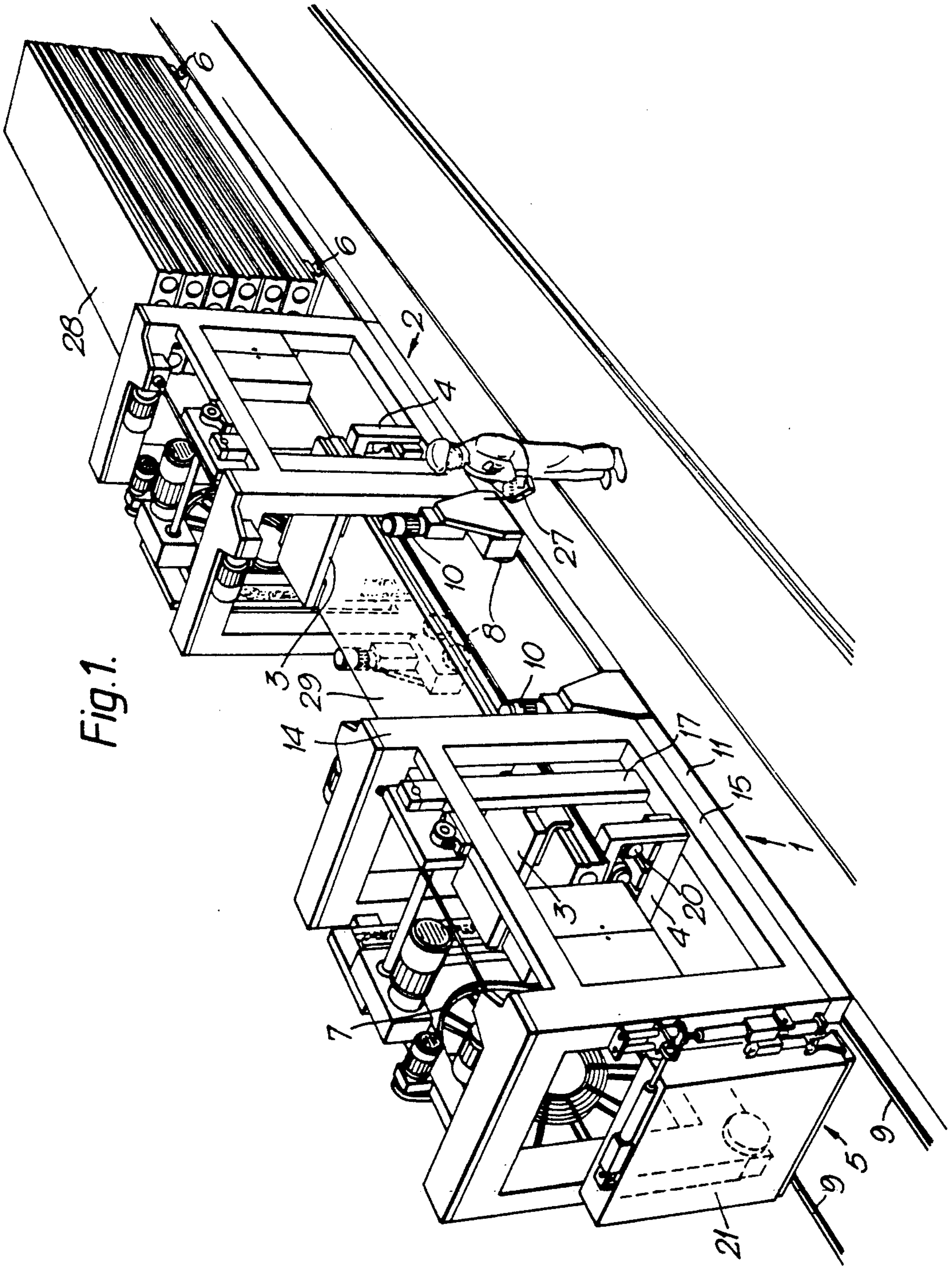
FIG. 1 is a perspective view of apparatus according to the invention.
Figure 2:
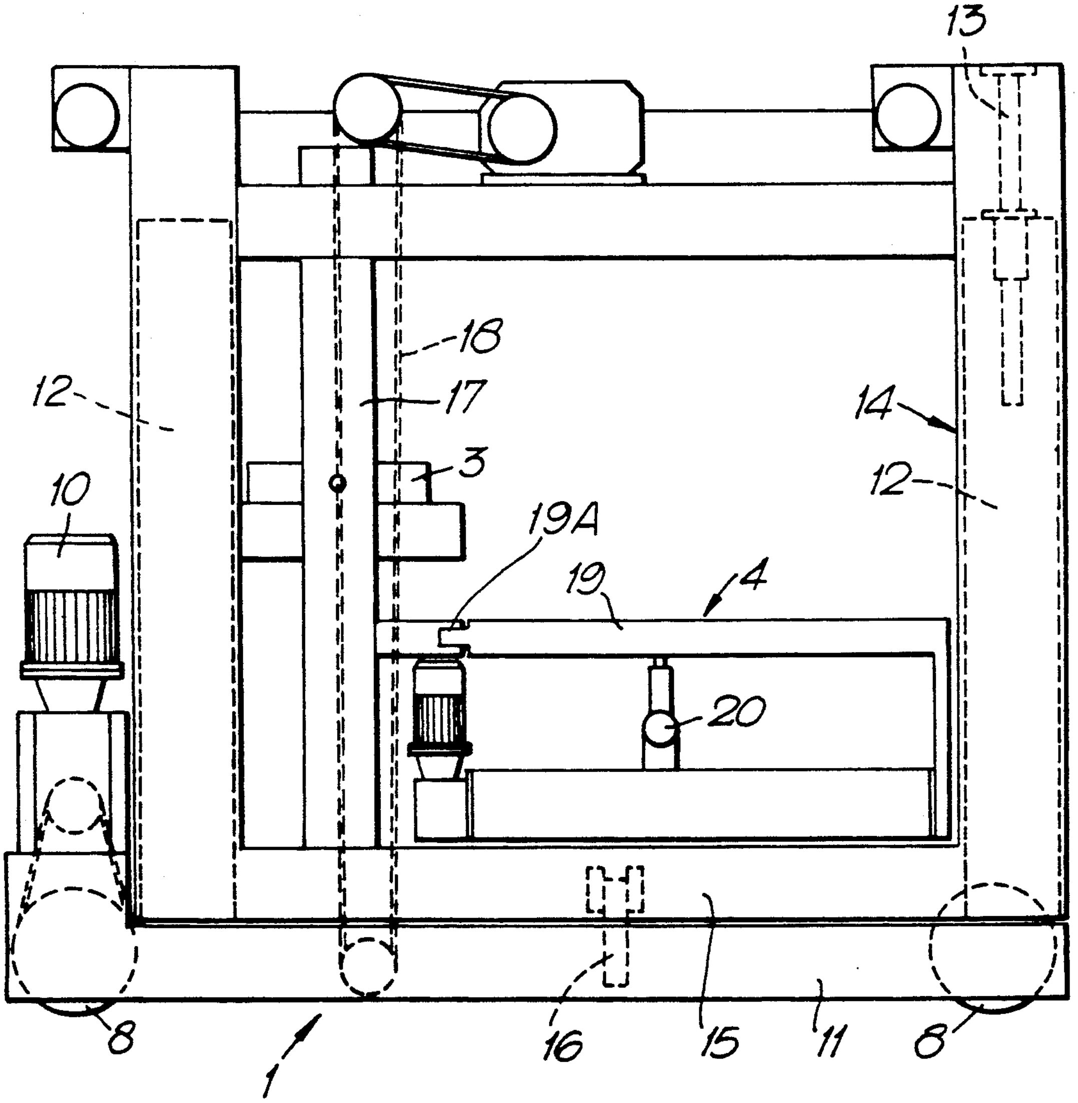
FIG. 2 is a side view of a first lifting unit of the apparatus, omitting showing an automatic support beam dispenser.
Figure 3:
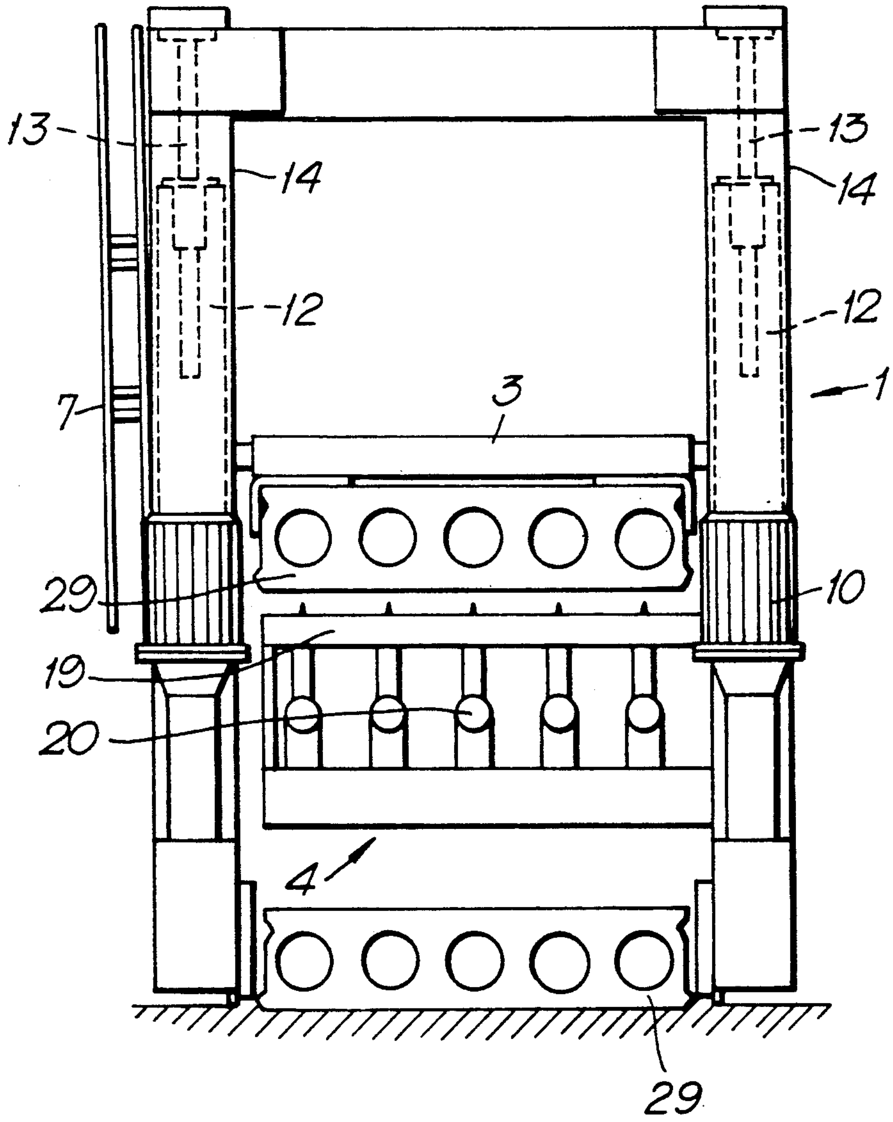
FIG. 3 is an end view of the first lifting unit of FIG. 2, again omitting showing the automatic support beam dispenser.

The apparatus of FIGS. 1 to 6 consists of two substantially identical lifting units 1 and 2, each of which has a lifting grab 3 for lifting a hollow slab, a drilling unit 4 and lifting devices for lifting a pile of slabs.

The first lifting unit 1 has an automatic support beam dispenser 5 for placing support beams 6 on the bed and for collecting them up again once they are no longer needed for supporting piles. Driving power is fed to the first lifting unit 1 through a main current cable which is wound around a cable coil 7. A driving power and control current cable wound around a cable coil of the second unit 2 feeds power from the first unit 1 to the second unit 2.

Figure 4:
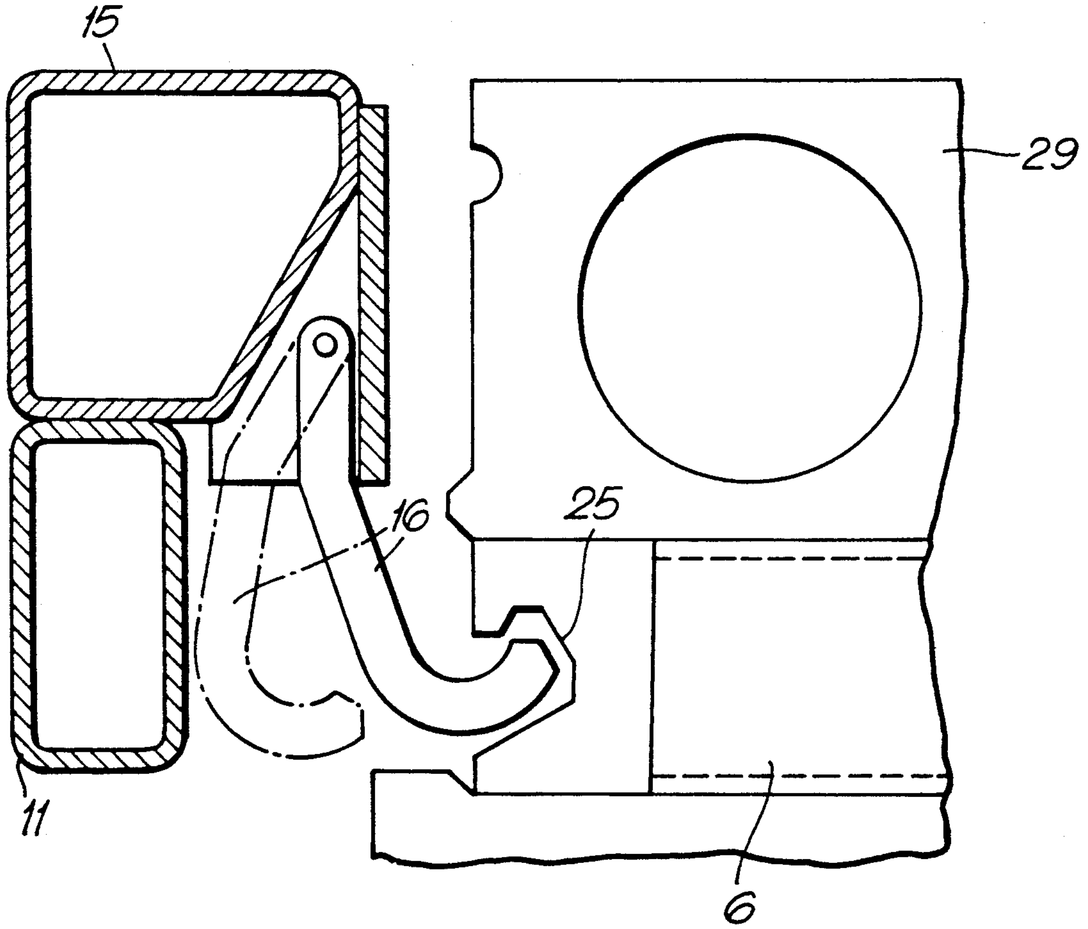
FIG. 4 is an enlarged cross-sectional view showing how the apparatus lifts a pile of slabs stacked on a support beam.
Figure 5:
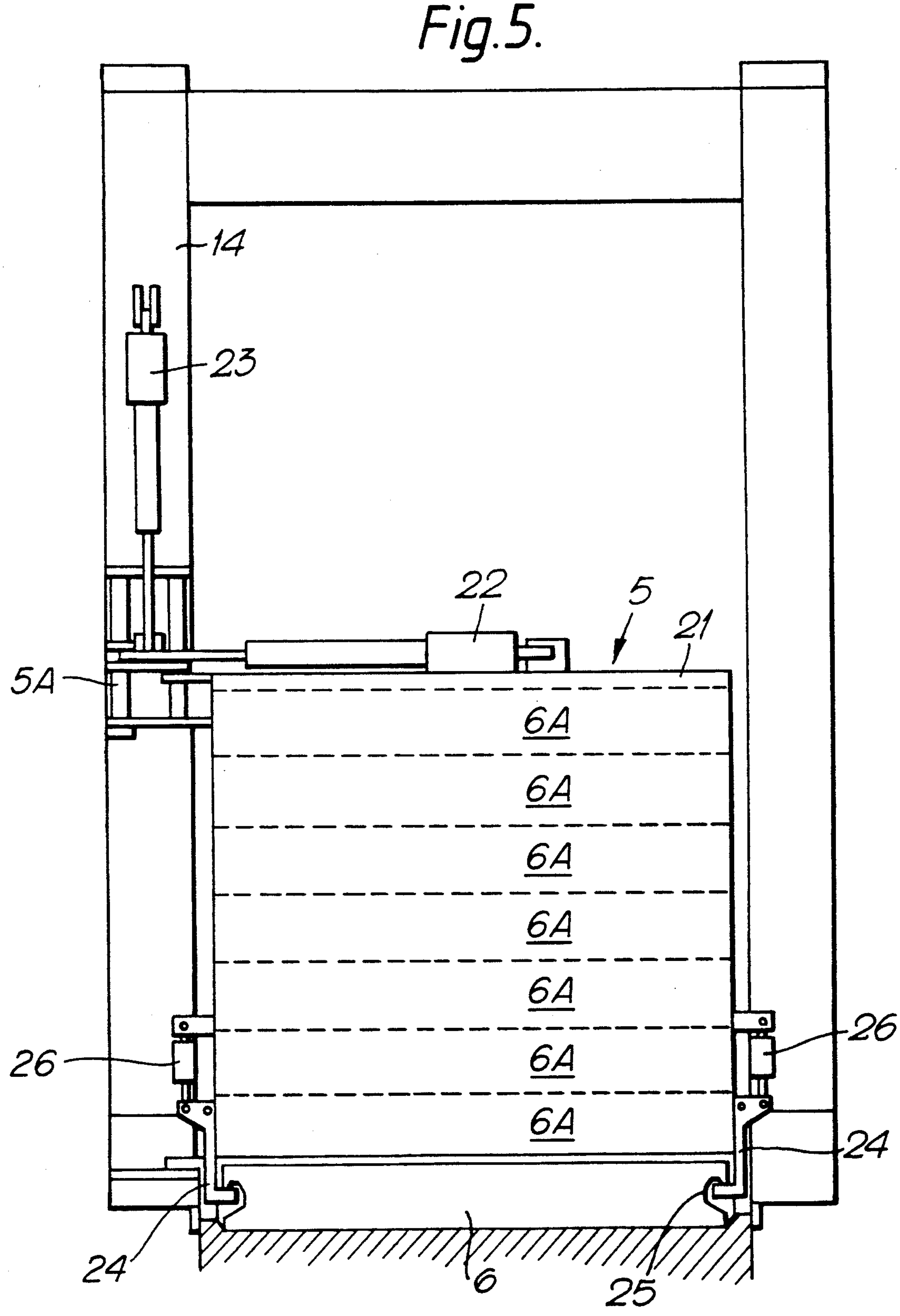
FIG. 5 shows the automatic support beam dispenser of the first lifting unit as viewed along the direction of the rails on which the lifting units run.
Figure 6:
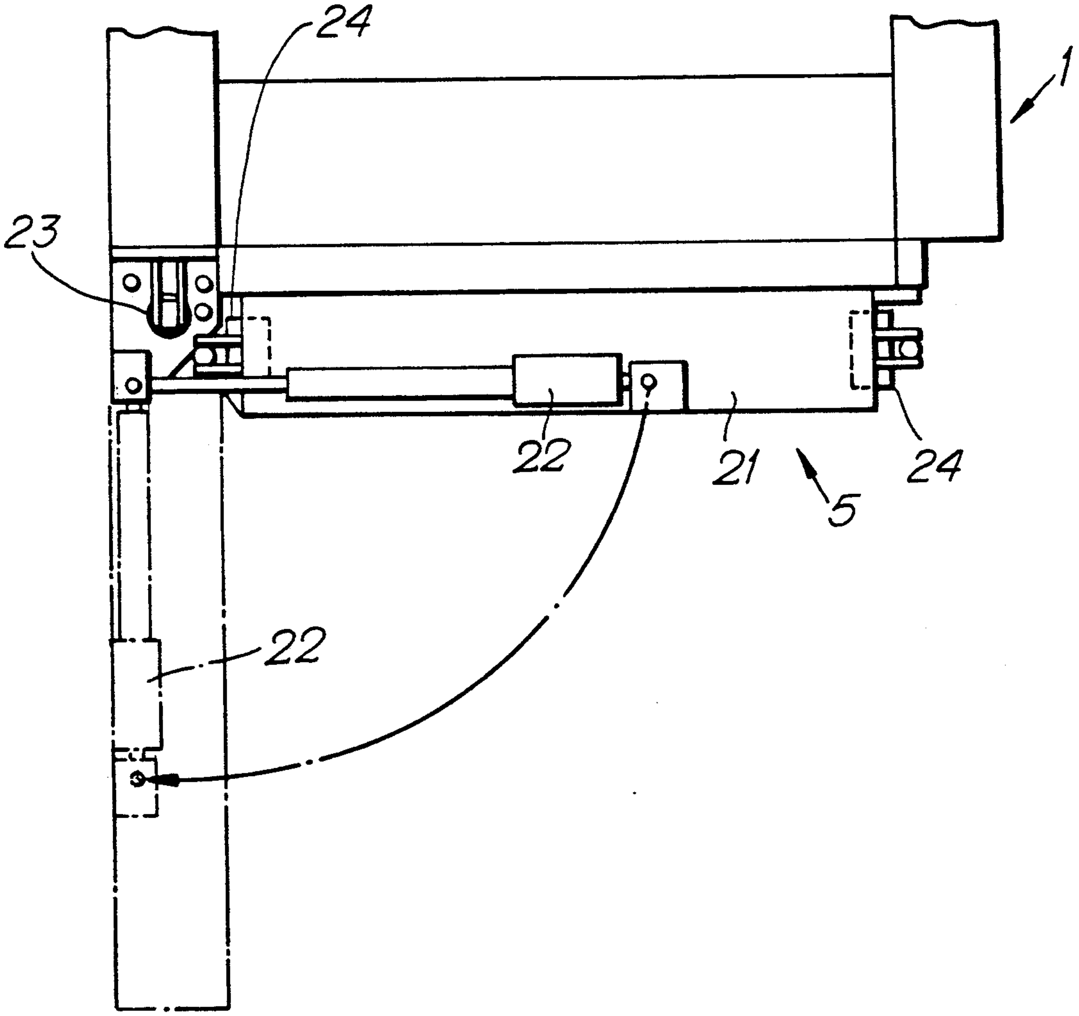
FIG. 6 is a plan view of the automatic support beam dispenser of FIG. 5.

Both lifting units 1 and 2 have bogies 8 so as to be movable. The units 1 and 2 move on the same rails 9 as a slide casting machine that moves along the prestressing bed to produce the slabs. The bogies 8 are driven by driving motors 10. On each end of two longitudinal horizontal beams 11 of a lower frame of each lifting unit, there is a supporting and guiding column 12. On the top of each column 12, there is a screw jack 13 for raising and lowering a stanchion 14 of an upper frame. The bottoms of the stanchions 14 are connected by longitudinal horizontal beams 15. Each horizontal beam 15 has a lifting hook 16 (FIG. 4).

The lower frame of each lifting unit 1 and 2 supports two columns 17 of a slab lifting crane. The pair of columns 17 support the lifting grab 3, which is raised and lowered by a chain drive 18. The lifting grab 3 can be opened and closed hydraulically.

The drilling unit 4 of each lifting unit 1 and 2 has horizontal structural main beams 19 and several parallel drills 20. The drills 20 are directed upwards and their spacing corresponds to the spacing of the hollows of the hollow slabs that are to be drilled. The drilling unit is hinged at one end on a vertical hinge 19A. Thus, the unit can be pivoted through 90° between a position transverse to the beams 15 (see FIGS. 1 and 3 and a position extending along the top of one of the beams 15 (see FIG. 2, which shows only the drilling unit 4 of the first lifting unit 1).

The dispenser 5 of the first lifting unit 1 has a container 21 (see FIGS. 5 and 6) in which the steel support beams 6 are stacked on each other. The entire dispenser 5, similarly to the drilling unit 4, can be turned through 90° on a vertical hinge 5A by a turing cylinder 22 so as to point in the direction of the rails 9. When the dispenser 5 has been rotated to the side of the lifting unit 1, the unit 1 can move past a pile of slabs 28 on the prestressing bed. The dispenser 5 is also equipped with a lifting cylinder 23 which enables the container 21 to be raised and lowered by the amount of the height of a slab. Thus, the lifting unit 1 is able to move over the slabs on the prestressing bed. The bottom of the container 21 is open and has catches 24 on both sides of the opening. The catches 24 engage notches 25 in the ends of the bottom beam in the container 21. Other beams 6A rest on the bottom beam. Both catches 24 can be raised and lowered and also advanced and retracted by cylinders 26.

The apparatus is controlled by programmable logic. The main logic unit is in one of the lifting units and in the other there is an auxiliary logic unit. Control signals are given by a portable radio unit 27.

The lifting units can be guided and moved either separately or as a pair a certain distance apart from each other. The desired distance can be set by moving the units independently of each other.

On both sides of the apparatus there is a seat (not shown) for the user. The lifting units can be connected together so that the bay crane can move them from one track to another. A more practical way to move the lifting units from one track to another is to construct a wagon for moving the unit sideways. The wagon is provided with a plug into which the main current cable of the first unit 1 is plugged. The wagon receives electricity via another cable. In this way, the main current cable from the wagon to the first unit 1 is maintained in the right direction so that it can be wound around the cable coil 7. Thus, theme is no need to transfer the cable from one plug to another.

The operation of the apparatus will now be described, starting at the point when the cast long slab has been cut into individual slabs of convenient length and the slabs are still lying on the prestressing bed.

The lifting units 1 and 2 are brough to the track and the dispenser 5 of the first unit 1 dispenses two beams 6 (see FIG. 1) for supporting the ends of the pile of slabs that will be stacked on the beams 6.

The lifting units 1 and 2 are then driven to be above the ends of a slab 29. The lifting grabs 3 are lowered down to the slab 29 and grip its ends. The slab is then lifted up approximately 1 meter. The drilling units 4 are rotated inwardly from the sides of the lifting units until they are under the slab in the position shown in FIG. 3. The slab is lowered onto the main beams 19 of the drilling units and the drilling units automatically perform the drilling of drainage holes in the slab. The slab is lifted from the drilling units, which rotate back into the sides of the lifting units. The entire drilling procedure can be performed whilst the lifting units 1 and 2 are moving along the tracks 9 to transfer the slab 29 to the pile of slabs 28. The slab 29 is moved to the pile 28 and lowered, whereupon the lifting grabs 3 open and can thus be lifted away from the slab. All of the slabs in the casting line are treated in the same manner.

The finished piles 28 are moved to the stockyard either immediately after each pile has been produced, or after all of the slabs have been piled.

Transferring of the pile 28 is performed as follows:

Pile lifting hooks 16 in the beams 15 of the lifting units 1 and 2 are inserted into the two beams 6 under the pile 28. The hooks 16 of one lifting unit are inserted into the ends of one beam 6 and the hooks 16 of the other lifting unit are inserted into the ends of the other beam 6. The hooks 16 are rotated into engagement with the notches 25 in the beams 6 by hydraulic cylinders (not shown) or similar actuating devices. The beams 15 of the lifting units are raised, whereby the pile is lifted along with the beams 15 and their hooks 16. The beams 15 are lifted by the screw jacks 13 extending the telescopically engaged columns 12 and stanchions 14. The lifting grabs 3, drilling units 4, container 21 etc. are lifted together with the upper frames of the lifting units 1 and 2. The pile 28 is lifted high enough to be able to carry the pile of slabs over the prestresspile at the end of the prestressing bed. The rails 9 had to the stockyard, where the pile 28 is lowered and stored.

Disassembling a hollow slab line approximately 120 meters in length and transferring it to the stockyard takes an average of 40–50 minutes.

Lifting aids can be attached to the lifting grabs 3 in order to permit the lifting of waste pieces and slabs of unusual shape.

When the beams 6 are not longer needed under the pile of slabs, the dispenser 5 collects them back up into the container 21.

The invention is not limited to the embodiment described, as alternative embodiments will occur to the man skilled in the art. For example, the lifting and lowering movements can be arranged otherwise than as described above. Also, other of the driving movements can be arranged in any other convenient known manner. All driving and regulating elements are not described in detail above because they are known per se.

Instead of the lifting hooks 16, pins may be used instead. The pins would move in the horizontal direction and slide into the notches 25 in the ends of the beams 6.

We claim:

1. A method for lifting concrete slabs from a prestressing bed and forming a pile of slabs for transfer to a stockyard comprising the steps of:

lifting a slab from said prestressing bed with a transfer device, said transfer device disposed on a transport track formed of a pair of rails extending on both sides of said prestressing bed;

moving said slab along said transport track and then lowering said slab onto a support structure;

repeating said lifting, moving and lowering steps so as to form a pile of slabs on said support structure; and lifting said support structure having said pile of slabs and moving said support structure having said pile of slabs along said transport track to said stockyard.

2. A method as set forth in claim 1, wherein said slab is lowered onto a support structure formed of two beams extending transversely to said slab.

3. An apparatus for lifting and transferring concrete slabs from a prestressing bed comprising:

first and second lifting units movably mounted on a pair of rails;

said first and second lifting units each including means for lifting and moving a slab from said prestressing bed to a support structure;

said first and second lifting units each including means for lifting and moving said support structure having at least one slab.

4. An apparatus as set forth in claim 3, wherein said means for lifting and moving said support structure includes a pair of gripping devices disposed on opposite sides of said first and second lifting units, said gripping devices being insertable into a lifting notch of said support structure, said gripping devices being vertically movable by means for adjusting lifting device height disposed on said first and second lifting units.

5. An apparatus as set forth in claim 3, wherein said means for lifting and moving a slab includes a lifting grab disposed within said first and second lifting units, said lifting grab being openable and closable for gripping and releasing said slab, said lifting grab being vertically movable by means for adjusting grab height disposed on said first and second lifting units.

6. An apparatus as set forth in claim 3, including means for moving said first and second lifting units along said rails both independently from each other and in conjunction with each other, said first and second lifting units being separated from each other by a desired distance when moved in conjunction with each other.

7. An apparatus as set forth in claim 3, including remote control means for controlling movement of said first and second lifting units.

8. An apparatus as set forth in claim 3, wherein at least one of said first and second lifting units includes a container for storing a plurality of beams for forming said support structure, said container having means for lowering said beams transversely to said rails at a desired location along said rails.

9. An apparatus as set forth in claim 3, wherein said first and second lifting units each include a drilling unit having at least one drill for drilling at least one drainage opening in a slab while said slab is being moved to said support structure.

10. An apparatus as set forth in claim 5, wherein at least one of said first and second lifting units includes a container for storing a plurality of beams for forming said support structure, said container having means for lowering said beams transversely to said rails at a desired location along said rails.

11. An apparatus as set forth in claim 10, wherein said first and second lifting units each include a drilling unit having at least one drill for drilling at least one drainage opening in a slab while said slab is being moved to said support structure.

12. An apparatus as set forth in claim 11, wherein said lifting grab, said drilling unit and said container for storing a plurality of beams are each movable on said first and second lifting units so as to avoid an obstruction between said rails.

* * * * *